(12) United States Patent
Boiko et al.

(10) Patent No.: US 12,166,432 B2
(45) Date of Patent: Dec. 10, 2024

(54) METHOD AND APPARATUS FOR AUTO-TUNING A CONTROLLER FOR A DC-AC CONVERTER

(71) Applicant: Khalifa University of Science and Technology, Abu Dhabi (AE)

(72) Inventors: Igor Boiko, Abu Dhabi (AE); Ahmed Shehada, Abu Dhabi (AE); Balanthi Mogru Abdul Rahiman Beig, Abu Dhabi (AE); Yan Yan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 238 days.

(21) Appl. No.: 18/010,648

(22) PCT Filed: Jun. 30, 2021

(86) PCT No.: PCT/IB2021/055878
§ 371 (c)(1),
(2) Date: Dec. 15, 2022

(87) PCT Pub. No.: WO2022/003601
PCT Pub. Date: Jan. 6, 2022

(65) Prior Publication Data
US 2023/0344366 A1    Oct. 26, 2023

Related U.S. Application Data

(60) Provisional application No. 63/046,471, filed on Jun. 30, 2020.

(51) Int. Cl.
*H02M 7/5387* (2007.01)
*G05B 11/42* (2006.01)
(Continued)

(52) U.S. Cl.
CPC ......... *H02M 7/53873* (2013.01); *G05B 11/42* (2013.01); *H02M 1/0025* (2021.05); *H02M 1/126* (2013.01)

(58) Field of Classification Search
CPC . H02M 7/53873; H02M 1/0025; H02M 1/126
See application file for complete search history.

(56) References Cited

U.S. PATENT DOCUMENTS 6,438,431 B1    8/2002  Wang et al.
7,925,362 B2    4/2011  Lee et al.
(Continued)

FOREIGN PATENT DOCUMENTS

CN      104426448 A        3/2015
WO      WO-2019211929 A1 *  11/2019  ........ H02M 7/53873
WO      WO-2019223785 A1 *  11/2019  ........ H02M 7/53873

OTHER PUBLICATIONS

Astrom, K. J. , et al., "Automatic Tuning of Simple Regulators with Specifications on Phase and Amplitude Margins", Automatica, vol. 20, No. 5, pp. 645-651, 1984.

(Continued)

*Primary Examiner* — Nguyen Tran
*Assistant Examiner* — Naomi L Carrier
(74) *Attorney, Agent, or Firm* — Billion & Armitage (57) ABSTRACT

A system including a proportional-integral-derivative (PID) controller, a modified relay feedback test (MRFT) block, a memory block, a biasing block, a dq0-to-abc transformation block, a switch configured to selectively couple output signal of the biasing block or the PID controller output signal to the input of the dq0-to-abc transformation block, a three phase digital pulse width modulator, electronic switches, a voltage sensor configured to measure the output of each voltage of the three phases on the load and produce voltage data signals ($V_{oa}$, $V_{ob}$, $V_{oc}$), and an abc-to-dq0 transformation block having an input being a representative (Continued)

of the phase voltages on the load, and producing an output being a representative of these voltages in the dq0 format.

12 Claims, 3 Drawing Sheets

(51) Int. Cl.
*H02M 1/00* (2007.01)
*H02M 1/12* (2006.01)

(56) References Cited

U.S. PATENT DOCUMENTS

| | | |
|---|---|---|
| 10,128,752 B1 | 11/2018 | Kanzian et al. |
| 10,481,562 B2 | 11/2019 | Jahanshahi et al. |
| 2018/0205229 A1* | 7/2018 | Mouni .................... H02M 1/12 |

OTHER PUBLICATIONS

Åström, Karl J., et al., "Advanced PID Control", Chapter 1, 12 pages.
Bernal-Perez, Soledad, et al., "Efficiency and Fault Ride-Through Performance of a Diode-Rectifier- and VSC-Inverter-Based HVDC Link for Offshore Wind Farms", IEEE Transactions on Industrial Electronics, vol. 60, No. 6, Jun. 2013.
Boiko, I., "Non-parametric Tuning of PID Controllers", Chapter 2, 15 pages.
Boiko,, I., "Analysis of Transient Oscillations in Systems with MRFT", Chapter 6, Non-parametric Tuning of PID Controllers, Advances in Industrial Control, 141-158.
Dash, Prajna Paramita, et al., "Dynamic Modeling and Performance Analysis of a Grid-Connected Current-Source Inverter-Based Photovoltaic System", IEEE Transactions on Sustainable Energy, vol. 2, No. 4, Oct. 2011.
Jin, Taotao, et al., "A Universal Vector Controller for Three-phase PFC, APF, STATCOM, and Grid-Connected Inverter", Nineteenth Annual IEEE Applied Power Electronics Conference and Exposition, 2004. APEC '04., 2004, pp. 594-600 vol.1.
Lai, Yen-Shin, et al., "Integrated Inverter/Converter Circuit and Control Technique of Motor Drives With Dual-Mode Control for EV/HEV Applications", IEEE Transactions on Power Electronics, vol. 29, No. 3, Mar. 2014.
Lelic, Muhidin, et al., "A Reference Guide to PID Controllers in the Nineties", IFAC Digital Control: Past, Present and Future of PIO Control, Terrassa, Spain, 2000, 69-78.
Noris, Mohd Fadzli Bin Mohd, "Comparison Between Ziegler-Nichols and Cohen-Coon Method for Controller Tunings", Chapter 1, Nov. 2006, 37 pages.
Shehada, Ahmed, et al., "Comparison of Relay Feedback Tuning and Other Tuning Methods for a Digitally Controlled Buck Converter", IECON 2019—45th Annual Conference of the IEEE Industrial Electronics Society, 2019, pp. 1647-1652.
Valerio, Duarte, et al., "Tuning of fractional PID controllers with Ziegler-Nichols-type rules", Signal Processing 86 (2006) 2771-2784.
Wang, Fengxiang, et al., "Advanced Control Strategies of Induction Machine: Field Oriented Control, Direct Torque Control and Model Predictive Control", Energies 2018, 11, 120; doi:10.3390/en11010120.
Wang, Quincy, et al., "An Intelligent Maximum Power Extraction Algorithm for Inverter-Based Variable Speed Wind Turbine Systems", IEEE Transactions on Power Electronics, vol. 19, No. 5, Sep. 2004.
Wang, Qing-Guo, et al., "Guaranteed Dominant Pole Placement with PID Controllers", 17th IFAC World Congress (IFAC'08), Seoul, Korea, Jul. 6-11, 2008, 5842-5845.
"International Search Report and Written Opinion Received mailed Sep. 13, 2021", Sep. 13, 2021, 9 pages.
I. Boiko "Non parametric Tuning of PID Controllers", Springer Verlag London, 2013, Chapter 3, pp. 29-31 <ISBN 978-1-4471-4464-9>.
Shehada, Ahmed, "Comparison of Relay Feedback Tuning and Other Tuning Methods for a Digitally Controlled Buck Converter", IECON 2019—45th Annual Conference of the IEEE Industrial Electronics Society, Retrieved from the Internet <doi: 10.1109/IECON.2019.8926893>, pp. 1647-1652.

\* cited by examiner

METHOD AND APPARATUS FOR AUTO-TUNING A CONTROLLER FOR A DC-AC CONVERTER

CROSS-REFERENCE TO RELATED APPLICATIONS

This application is a National Stage Application of International Patent Application No. PCT/IB2021/055878 filed Jun. 30, 2021, which claims priority under Article 8 of the Patent Cooperation Treaty to U.S. Provisional Patent Application 63/046,471 filed in the Unites States Patent and Trademark Office on Jun. 30, 2020, the entire disclosure of each of which is hereby incorporated by reference.

FIELD OF INVENTION

The present invention relates to a method and an apparatus for auto-turning a controller for a DC-AC converter.

BACKGROUND

Switched-mode DC-AC power voltage-source converters (VSCs) find use in a wide variety of applications, such as energy transformation in solar/wind farms, power system control and compensation, electric motor drives, and others. The output power of VSCs ranges from providing watts of power in system-on-chip power management applications to megawatts of power in power supply systems. Although many control theories and methods have emerged for 3-phase DC-AC VSCs, field-oriented control and proportional-integral-derivative (PID) control are still the most mature and the most widely used. Studies estimate that at least 90% of all industrial controllers are PID controllers. PID controller tuning techniques comprise two categories:

1) Parametric tuning methods, such as direct pole placement and dominant pole design, where the features of systems in the time or frequency-domain are used to identify the mathematical model of the system and the controller is designed based on the mathematical model developed therefrom. But the identification of a mathematical model of a process is sometimes complicated, and it is only an approximation of the process. Thus, the PID controller tuning based on a mathematical model may not produce the desired performance, and engineers often have to revert to trial-and-error methods to further fine tune the PID controller, which tends to be a difficult and time-consuming task.
2) Non-parametric tuning methods on the other hand do not involve developing a mathematical model; examples of non-parametric tuning methods include the Ziegler-Nichols, Cohen-Coon, and Åström-Hägglund methods. In such methods certain features of a system in the time or frequency-domains are measured and used to directly tune a PID controller, typically using what are called tuning rules. Tuning rules take the measurements from an initial test stage as input and use them to calculate the tuned PID parameters. In such cases where a test is performed on the actual system, the actual dynamics of the system are captured, which avoids inaccuracies that are characteristic of mathematical models. For example, in power converters, tuning using a test stage that is performed on the actual system helps account for component tolerance, component ageing, and parasitic effects in the circuit. It would also account for the actual value of the connected load, as well as include the influence of the input capacitance of a next-stage converter.

The "continuous cycling" procedure and its associated Ziegler-Nichols tuning rules, and the relay feedback test and its associated phase margin tuning rules have been hugely influential in PID auto-tuning practice. However, there is still a need to iteratively test the gain margin of the process, and control of the system may be lost when adjusting the system gain. While the Ziegler-Nichols test procedures are not widely used, the Ziegler-Nichols tuning rules are indeed applied in many applications, especially where high dynamic performance is not critical.

Since Åström and Hägglund proposed a PID autotuning method based on the relay feedback test (RFT), the method has been developed by many researchers and industrial applications. In the conventional RFT, the PID controller is replaced by a relay unit to generate sustained oscillation. By measuring the amplitude and period of the oscillation, the PID parameters can be calculated by substitute measured data into Ziegler-Nichols formulas. The conventional relay feedback quickly generates sustained oscillations without requiring iterations, thus the tuning efficiency is improved. The measured data is substituted into the Ziegler-Nichols tuning rules. However, neither stability is guaranteed, nor gain or phase margin can be specified. Several variations based on the relay feedback test have been proposed for the auto-tuning of PID controller.

U.S. Pat. No. 10,481,562, B2 discloses a method of tuning a controller based on the relay-feedback. It focuses on how to select the approximate relay magnitude and fixed hysteresis to avoid losing control of the process, thus ensuring the safety of the process. However, the method is based on the mathematical analysis, which may not correctly match the real system. The method uses the Ziegler-Nichols tuning rules, which may not produce a good tuning result for switched-mode DC-AC power VSCs, as the application and experiment are not specified.

U.S. Pat. No. 10,128,752, B1 discloses a system a method for controller auto-tuning using a perturbation sequence. The perturbation may include but is not limited to a pseudo-random binary sequence or a sinusoidal chirp sequence. The method is specified to multi-phase DC-DC buck converters. A perturbation sequence is injected onto a duty cycle for each phase of the converter, and an identification of the system is performed by determining a coefficient vector based on the output voltage and the set of perturbed duty cycle values; the controller is then tuned based on the derived coefficient vector. The dimension of the coefficient vector depends on the number of phases of the multi-phase buck converter; thus, the computing requirements increase exponentially with the number of phases. Moreover, the patent does not present the details of tuning procedures after acquiring the natural frequency of the process.

U.S. Pat. No. 7,925,362 B2 discloses a method of using integral of relay feedback response for improving the tuning quality. It demonstrates that the effects of harmonics may be mitigated by feeding back the integral of the process output instead of feeding back the process output.

U.S. Pat. No. 6,438,431 B1 discloses a method that replaces the relay unit by two relays, one standard relay unit and another a so-called parasitic relay, which together are arranged in a manner that allows for more points on the process frequency response to be accurately identified using only a single relay test.

The present invention proposes a method for the autotuning of a PID controller for the class of 3-phase DC-AC VSCs with an LC filter and a resistive load. Autotuning may be defined as the automatic online tuning of a controller either upon a user command or the occurrence of a pre-defined event, or at pre-set intervals set by the user. The proposed method is based on the modified relay feedback test (MRFT) auto-tuning method, which uses a single test stage and single tuning stage. The present invention proposes an appropriate application of the MRFT auto-tuning method to the mentioned class of VSCs by devising a method and apparatus of doing so. The resulting controller is expected to produce good dynamic performance when applied to a wide range of converters of the family of 3-phase DC-AC VSCs with an LC filter and a resistive load.

SUMMARY

According to one or more aspects of the present disclosure, a system includes a PID controller having a voltage error input and a modulation index output, a digital pulse-width modulation (DPWM) module, power-electronic switches (such as IGBTs) configured as a 3-phase DC-AC VSC receiving an output of the DPWM, a voltage sensor configured to measure the output voltage in each of the three phases of the 3-phase DC-AC VSC then pass it on to an analog-to-digital converter to produce a digital equivalent of the measured voltage signals, and a modified relay feedback test (MRFT) block.

In one or more embodiments of the system according to the previous paragraph, the system further includes a software switching function (or software switch) to control the switching between a MRFT block and a PID controller.

In one or more embodiments of the system according to any one of the previous paragraphs, the system further includes instructions to perform a Park transformation (abc-dq0) and an inverse Park transformation (dq0-abc).

In one or more embodiments of the system according to any one of the previous paragraphs, an input to a MRFT block is an error signal obtained by comparing a reference output voltage ($V_{d\text{-}ref}$) and a transformed output voltage ($V_d$), where the latter is obtained by transforming the three measured VSC AC phase voltages ($V_{oa}$, $V_{ob}$, $V_{oc}$) into the dq0 format ($V_d$, $V_q$, $V_0$), then taking only the d-channel value of the transformed quantities.

In one or more embodiments of the system according to any one of the previous paragraphs, the 3-phase DC-AC VSC further includes a filter comprising at least one inductor and at least one capacitor and a resistive load.

According to one or more aspects of the present disclosure, a method of tuning a PID controller of a 3-phase DC-AC VSC providing a 3-phase voltage output is provided. The method includes:

a) measuring the AC voltages ($V_{oa}$, $V_{ob}$, $V_{oc}$) in each of the three phases of the VSC;
b) performing a Park transformation (abc-to-dq0) of the measured AC voltages to obtain dc-valued quantities ($V_d$, $V_q$, $V_0$);
c) comparing only $V_d$ to a desired voltage output, $V_{d\text{-}ref}$, and producing an error signal;
d) applying the error signal simultaneously to the input of a PID controller and to the input of a MRFT block, where the PID controller is of the format $$W_c(s) = K_c\left(1 + \frac{1}{T_i s} + T_d s\right),$$

where s is the Laplace variable;

e) using a memory block to store the current value of the modulation index produced by the PID controller, but holding this value constant once control is switched from PID to MRFT;
f) producing an output from the MRFT block (with a MRFT threshold parameter β set to 0.8 and a MRFT magnitude h set as appropriate by the user);
g) using the MRFT block output as input to the bias block and simultaneously activating a software switch that couples the output of the bias block to an inverse Park transformation (dq0-abc) block;
h) performing an inverse Park transformation (dq0-abc) on the value fed by the bias block to obtain abc modulation signals;
i) using the abc modulation signals as input to the DPWM, which controls the switches that supply voltages to each of the three phases of the DC-AC VSC, thereby resulting in three AC voltages that are additionally modulated by the output of the MRFT block (plus a bias);
j) measuring the frequency ($\Omega_0$) and the amplitude ($a_0$) of the self-sustained oscillations that appear in the DC transformed voltage ($V_d$) as a result of the MRFT;
k) computing PID parameters $K_c$, $T_i$, and $T_d$ based on the following equations, wherein $c_1$=0.95±5%, $c_2$=0.36±5%, and $c_3$=0.12±5%;

$$K_c = c_1 \frac{4h}{\pi a_0}, \quad T_i = c_2 \frac{2\pi}{\Omega_0}, \quad \text{and} \quad T_d = c_3 \frac{2\pi}{\Omega_0}$$

l) switching back from the MRFT block to the PID block using the software switch, where the PID block now uses the newly calculated parameters $K_c$, $T_i$, and $T_d$;

In one or more embodiments of the method according to the previous paragraph, only one of the transformed output voltage values, that being the d-channel value or $V_d$, is compared to the desired voltage output set point, $V_{d\text{-}ref}$.

According to one or more aspects of the present disclosure, non-transitory computer readable storage medium having data stored therein representing software executable by a computer. The software includes instructions to:

measure voltages of each of the three phases of a 3-phase DC-AC VSC;
perform a Park transformation (abc-to-dq0) of the measured AC voltages ($V_{oa}$, $V_{ob}$, $V_{oc}$) values to obtain dc-valued quantities ($V_d$, $V_q$, $V_0$);
compare one of the output voltage values, that being the d-channel value or $V_d$, to a desired voltage output set-point, $V_{d\text{-}ref}$ and produce an error signal;
apply the error signal simultaneously to the input of a PID controller and to the input of a MRFT block, where the PID controller is of the format $$W_c(s) = K_c\left(1 + \frac{1}{T_i s} + T_d s\right),$$

where s is the Lalace variable;
use a memory block to store the current value of the modulation index produced by the PID controller, but holding this value constant once control is switched from PID to MRFT;

produce an output from the MRFT block (with a MRFT threshold parameter β set to 0.8 and a MRFT magnitude h set as appropriate by the user);

use the MRFT block output as input to the bias block and simultaneously activate a software switch that couples the output of the bias block to an inverse Park transformation (dq0-abc) block;

perform an inverse Park transformation (dq0-abc) on the value fed by the bias block to obtain abc modulation signals;

use the abc modulation signals as input to the DPWM, which controls the switches that supply voltages to each of the three phases of the DC-AC VSC, thereby resulting in three AC voltages that are now modulated by the output of the MRFT block (plus a bias);

measure the frequency ($\Omega_0$) and the amplitude ($\alpha_0$) of the self-sustained oscillations that appear in the $V_d$ as a result of the MRFT;

compute PID parameters $K_c$, $T_i$, and $T_d$ based on the following equations, wherein $c_1=0.95\pm5\%$, $c_2=0.36\pm5\%$, and $c_3=0.12\pm5\%$;

$$K_c = c_1 \frac{4h}{\pi a_0}, T_i = c_2 \frac{2\pi}{\Omega_0}, \text{ and } T_d = c_3 \frac{2\pi}{\Omega_0}$$

switch back from MRFT block to the PID block using the software switch, where the PID block now uses the newly calculated parameters $K_c$, $T_i$, and $T_d$ parameters;

BRIEF DESCRIPTION OF THE DRAWINGS

The present invention will now be described, by way of example with reference to the accompanying drawings, in which.

DETAILED DESCRIPTION

The present invention includes a method of using the modified relay feedback test autotuning method in order to tune a PID controller of a 3-phase DC-AC VSC, where the resulting controller is expected to produce near-optimal dynamic performance when applied to a wide range of converters of the family of 3-phase DC-AC VSCs. Unlike the methods described in the BACKGROUND section, the modified relay feedback test autotuning method includes tuning rules that guarantee a desired gain or phase margin.

The MRFT auto-tuning is a non-parametric PID controller tuning method, meaning that it does not require identification of the system or any of its parameters. The MRFT auto-tuning guarantees a specified gain or phase margin and can be designed to achieve high dynamic performance. The method consists of a simple test stage and a tuning stage. The PID controller to be tuned is of the following form, where $K_c$ is the proportional gain, $T_i$ the integral time and $T_d$ the derivative time.

$$W_c(s) = K_c \left(1 + \frac{1}{T_i s} + T_d s\right) \quad (1)$$

The tuning rules of the PID controller are as follows, where coefficients $c_1$, $c_2$, and $c_3$ are positive constants.

$$K_c = c_1 K_u, T_i = c_2 T_u, T_d = c_3 T_u \quad (2)$$

Figure 1:
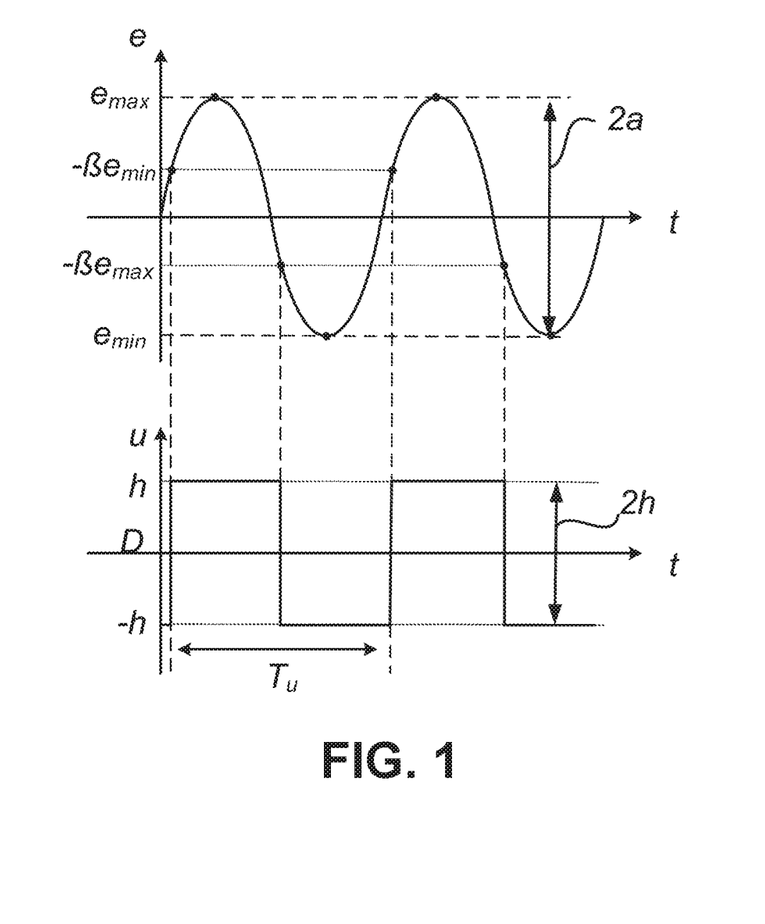
FIG. 1 shows a graph of the switching conditions according to some embodiments.
Figure 2:
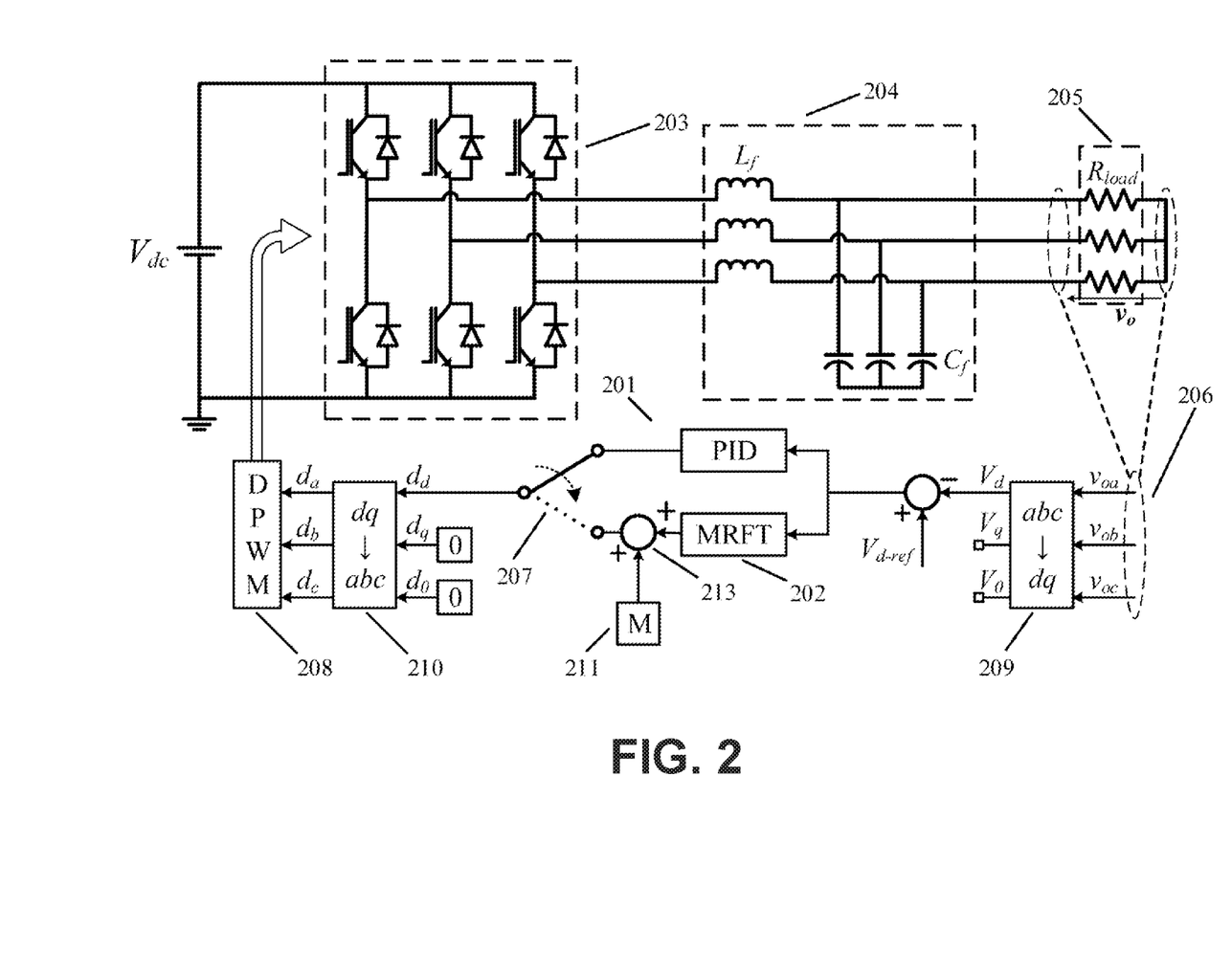
FIG. 2 shows a schematic diagram of a 3-phase DC-AC VSC having an MRFT block to tune a PID controller for according to some embodiments.

$K_u$ and $T_u$ are outputs of the test stage that will be explained shortly. The coefficients of the tuning rules ($c_1$, $c_2$, $c_3$), as well as a threshold parameter (β), must be selected before the online MRFT auto-tuning is conducted. The present invention proposes the values of β=0.8, $c_1=0.95\pm5\%$, $c_2=0.36\pm5\%$, and $c_3=0.12\pm5\%$, which were obtained using a simulation-based optimization procedure that has an objective of resulting in near-optimal dynamic performance of the PID controller;

With reference to FIG. 2, the test stage is performed by replacing the PID controller with an MRFT block and running the system in closed-loop for a certain desired duration, which typically is only from 25% to 50% the duration of a 50 Hz line cycle;

In its original form according to prior art, the MRFT block has the following logic:

$$u(t) = \begin{cases} h, & \begin{array}{l} e(t) \geq -\beta e_{min} \\ \text{if or} \\ \{e(t) \geq -\beta e_{max} \ \& \ u(t-) = h\} \end{array} \\ -h, & \begin{array}{l} e(t) \leq -\beta e_{max} \\ \text{if or} \\ \{e(t) \leq -\beta e_{min} \ \& \ u(t-) = -h\} \end{array} \end{cases} \quad (3)$$

wherein the threshold parameter β is in the range 0<β<1, and where $e_{max}$ and $e_{min}$ represent the last (positive) maximum and last (negative) minimum of the error signal e(t), respectively. u(t−) is the control output immediately prior to time t. The auto-tuning is started with a test stage, where the MRFT block replaces the PID controller, and the system is run in closed loop. FIG. 1 provides a diagrammatic illustration of the waveforms in the test stage of the MRFT auto-tuning method. The test starts with $e_{max}$ and $e_{min}$ set to zero. Since u(t) is always non-zero, oscillations start to develop in y(t) and e(t). Every time a minimum ($e_{min}$) or maximum ($e_{max}$) of the error waveform is recorded, the corresponding switching condition ($\beta e_{min}$ or $\beta e_{max}$) for the upcoming half-cycle is updated. Oscillations typically stabilize after a few transient cycles, such that $e_{max}=-e_{min}$. Let the amplitude of the oscillations once they have stabilized be $\alpha_0=e_{max}=-e_{min}$ and let $\Omega_0=2\pi/T_u$ be the measured frequency of oscillations (in rad/s). The MRFT thus acts as a hysteretic relay with a dynamically-changed hysteresis value that depends on the amplitude of oscillations $\alpha_0$. The ultimate gain, $K_u$, is calculated as follows.

$$K_u = \frac{4h}{\pi a_0} \quad (4)$$

The original MRFT auto-tuning as described in prior art is not suitable for application to a 3-phase DC-AC VSC. The present invention proposes an appropriate application of the MRFT auto-tuning method to 3-phase DC-AC VSCs by devising the method and apparatus of doing so.

For the duration of the test stage of the MRFT autotuning method, a double-modulation scheme is followed. The usual modulation of the 3-phase voltages of a 3-phase DC-AC VSC via the DPWM is maintained, and an extra modulation due to the MRFT block is superposed on top of it.

Figure 3:
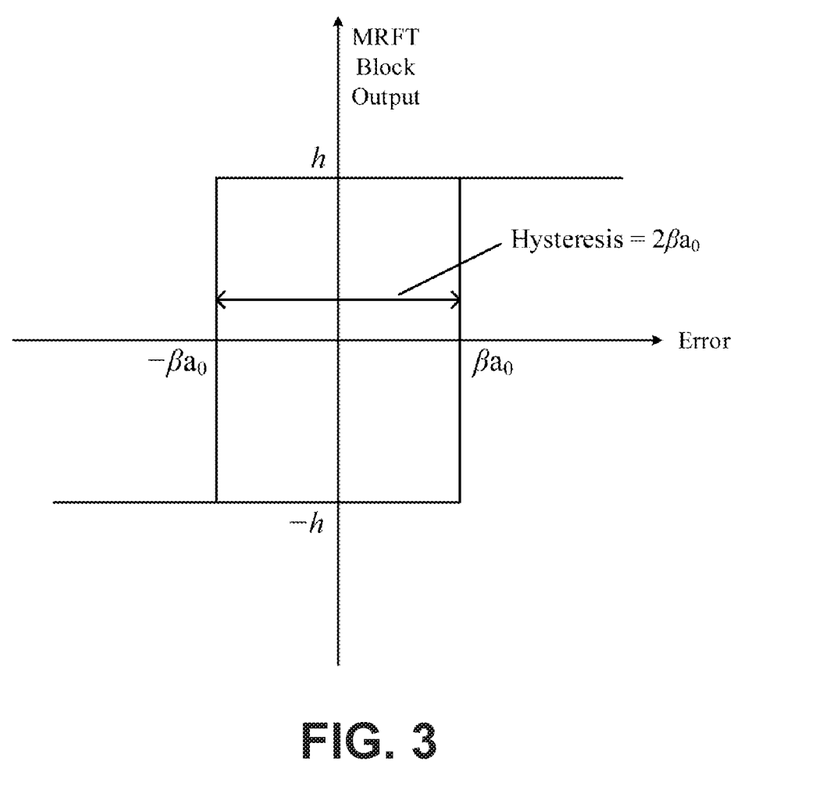
FIG. 3 shows a diagram that illustrates the dynamically changing hysteresis of the MRFT block according to some embodiments.

With reference to FIG. 2, the proposed procedure for doing so is as follows:

a. An MRFT block is used, which is governed by the nonlinear characteristic of a relay with magnitude (h), and a hysteresis depending on the amplitude ($\alpha_0$) of the self-sustained oscillations in the DC-valued transformed voltage ($V_d$) that are generated due to the MRFT block, with the hysteresis width computed as ($2\beta \times \alpha_0$); the logic of the MRFT block is also illustrated in FIG. 3;

b. A memory block (211) records the current value of the modulation index (D) produced by the d-channel PID controller, and is continuously updated whenever the PID controller produces a new value;

c. When the user desires to perform the MRFT autotuning, a switch is activated, upon which the current modulation (D) index stored in the memory block (211) is held constant;

d. Simultaneously, the output of the MRFT block, which is equal to +h or −h (where h is the MRFT magnitude, typically 3%-8% of D), is added using a bias block to the value that is now held constant in the memory block (211);

e. Also simultaneously, the output of the bias block is coupled to an inverse Park transformation (dq0-abc) block; this way double-modulated signal containing the "frozen" PID controller output (D) that is stored in the memory block (211), plus the MRFT modulation (+h or −h), is sent to the DPWM block; thus, the new modulated d-channel duty-cycle is either to D+h when the relay ON, and to D−h when the relay is OFF.

The MRFT block logic may also be described in the form of an equation, as given in eq (5) below. Compared to eq (3), the logic in eq (5) includes D, which allows for the double-modulation, and additionally it has been enhanced to allow for both positive and negative values for A whereas the logic in (3) only allowed a positive $\beta$.

$$u(t) = \begin{cases} D+h, \text{ if } & \{e(t) \geq b_1 \ \& \ u(t-) = D-h\} \\ & \text{ or} \\ & \{e(t) \geq -b_2 \ \& \ u(t-) = D+h\} \\ D-h, \text{ if } & \{e(t) \leq -b_2 \ \& u(t-) = D+h\} \\ & \text{ or} \\ & \{e(t) \leq b_1 \ \& \ u(t-) = D-h\} \end{cases} \quad (5)$$

For improved accuracy, $T_u$ and $\alpha_0$ are best computed as the average over a few oscillation cycles.

The tuning stage is then simply to calculate $K_u$ using (4), then calculate the updated PID parameters using (2).

An advantage of the present invention is that it can guarantee a desired gain or phase margin with only one test stage and one tuning stage, both without iterations, thus resulting in time savings and guaranteed stability.

A further advantage of the present invention is that the proposed tuning rules can achieve near optimal tuning for a large set of 3-phase DC-AC with the appropriate choice of the tuning rule coefficients, $c_1$, $c_2$, $c_3$ and the threshold parameter $\beta$. As given above, the suggested values of these parameters, obtained using obtained using a simulation-based optimization procedure that has an objective of resulting in near-optimal dynamic performance of the PID controller, are: $\beta=0.8$, $c_1=0.95\pm5\%$, $c_2=0.36\pm5\%$, and $c_3=0.12\pm5\%$.

The present invention may be applied to standalone 3-phase DC-AC VSCs such as those found in uninterruptible power supplies and off-grid power systems.

The distinctive feature of the present invention is the adaptation of the MRFT autotuning method to 3-phase DC-AC VSCs, which guarantees the specified gain or phase margin defined by the user. Also, the provided values of the threshold parameter $\beta=0.8$ and the tuning rules coefficients $c_1=0.95\pm5\%$, $c_2=0.36\pm5\%$, and $c_3=0.12\pm5\%$, near-optimal dynamic performance of the autotuned PID controller is obtained for a wide range of designs of 3-phase DC-AC VSCs with an LC filter and a resistive load.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

The invention claimed is:

1. A system, comprising:
    a summation block having a first input being a reference voltage representative ($V_{d\text{-}ref}$) and a second input being a representative of a measured voltage ($V_d$) on a load, and an output having a value of a difference between a first input signal and a second input signal;
    a proportional-integral-derivative (PID) controller having an error signal as an input and an output representing a modulation index;
    a modified relay feedback test (MRFT) block with magnitude (h) and a threshold parameter ($\beta$) having an input being the error signal and an output representing a modulation index increment/decrement value;
    a memory block having the PID controller output signal as an input and configured to store a last value of the PID controller output signal;
    a biasing block having an output signal of the MRFT block as a first input and an output signal of the memory block as a second input, and an output signal being a sum of the first input signal and the second input signal;
    a dq0-to-abc transformation block having an input representative of the modulation index in a dq0 format, and producing three outputs being representative of modulation indexes for three AC phases;
    a switch configured to selectively couple output signal of the biasing block or the PID controller output signal to the input of the dq0-to-abc transformation block, wherein the switch decouples an unselected input when coupling a selected input;
    a digital pulse width modulator having three inputs being the output signals of the dq0-to-abc transformation block and producing control signals;
    electronic switches receiving the control signals of the digital pulse-width modulator and providing a three-phase AC power by high-frequency modulation of a DC power source;
    a voltage sensor configured to measure the voltage of the three phases on the load and produce voltage data signals ($V_{oa}$, $V_{ob}$, $V_{oc}$); and
    an abc-to-dq0 transformation block having an input being a representative of the phase voltages on the load, and producing an output being a representative of these voltages in the dq0 format.

2. The system according to claim 1, further comprising:
    filters comprising at least one inductor and at least one capacitor in each phase and connected between the switches and a load to suppress high-frequency fluctuations of a current through the load.

3. The system according to claim 1, wherein the abc-to-dq0 transformation block is further configured to perform a Park transformation on the voltage data signals ($V_{oa}$, $V_{ob}$, $V_{oc}$), thereby providing voltage data in dq0 format ($V_d$, $V_q$).

4. The system according to claim 1, wherein the dq0-to-abc transformation block is further configured to perform an inverse Park transformation on the modulation index data signal ($d_d$), thereby providing modulation indexes for each phase in abc format.

5. The system according to claim 1, wherein the MRFT block is governed by a nonlinear characteristic of a relay with magnitude (h) and a hysteresis depending on an amplitude ($a_0$) of self-sustained oscillations of the DC transformed voltage ($V_d$) that are generated due to the MRFT block, with a hysteresis duration computed as $2\beta \times a_0$, which is updated while running the MRFT block in accordance with a change of the amplitude ($a_0$).

6. A method of tuning a proportional-integral-derivative (PID) controller of a pulse width modulated DC-AC power inverter, including a dq0-to-abc transformation block, a pulse-width modulator and electronic switches, providing a three-phase voltage output ($V_{oa}$, $V_{ob}$, $V_{oc}$) using a MRFT block with desired magnitude (h) and threshold parameter ($\beta$), the method comprising:

a) measuring the voltages in each of the three phases of AC voltage outputs ($V_{oa}$, $V_{ob}$, $V_{oc}$) of the DC-AC power inverter;

b) perform a Park transformation (abc-to-dq0) to obtain DC transformed voltage values ($V_d$, $V_q$) of the AC voltage outputs ($V_{oa}$, $V_{ob}$, $V_{oc}$);

c) comparing one of the DC transformed voltage values ($V_d$, $V_q$) to a desired voltage output set point and producing an error signal;

d) applying the error signal to an input of the MRFT block;

e) running the MRFT block with threshold parameter ($\beta$) and magnitude (h) and producing an output from the MRFT block that is an increment/decrement value for a modulation index of a last memorized value of the PID controller before switching to the control by the MRFT;

f) using a sum of the modulation index and increment or decrement output value from a modified relay module as a new modulation index input for the dq0-to-abc transformation block;

g) applying the output of the dq0-to-abc transformation block to the input of the pulse-width modulator; and h) applying the modulating signal to the electronic switches for phases a, b and c, thereby producing three AC voltages modulated by a biased output signal of the MRFT block.

7. The method according to claim 6, wherein only one of the DC transformed voltage values (Va) is compared to the desired voltage output set point.

8. The method according to claim 6, further comprising the steps of:

i) initializing values for the threshold parameter $\beta$ and desired phase margin $\phi_m$;

j) running the MRFT block based on the values of $\beta$ and h to produce self-sustained oscillations in the DC transformed voltage ($V_d$);

k) upon stabilization of a frequency and amplitude of the self-sustained oscillations of the DC transformed voltage ($V_d$), measuring the frequency ($\Omega_0$) and the amplitude ($a_0$) of the self-sustained oscillations of the DC transformed voltage ($V_d$);

l) Selecting the values of $c_1$, $c_2$ and $c_3$ that satisfy equations:

$$c_1\sqrt{1+\xi^2}=1 \text{ and } \beta=\sin(\phi_m-\tan^{-1}\xi), \text{ where}$$

$$\xi = 2\pi c_3 - \frac{1}{2\pi c_2},$$

and ($\phi_m$) is a desired phase margin; and m) computing PID parameters $K_c$, $T_i$, and $T_d$ based on the equations:

$$K_c = c_1\frac{4h}{\pi a_0}, \ T_i = c_2\frac{2\pi}{\Omega_0}, \text{ and } T_d = c_3\frac{2\pi}{\Omega_0}$$

9. The method according to claim 8, wherein $\beta=0.8$, $c_1=0.95\pm5\%$, $c_2=0.36\pm5\%$, and $c_3=0.12\pm5\%$.

10. A non-transitory computer readable storage medium having data stored therein representing software executable by a computer, the software including instructions to:

measure voltages of each of three phases of AC voltage outputs ($V_{oa}$, $V_{ob}$, $V_{oc}$) of a DC-AC power inverter, controlled by a proportional-integral-derivative (PID) controller having a reference voltage input and a modulation index output to a dq0-to-abc transformation block of the DC-AC power inverter;

perform a Park transformation (abc-to-dq0) of the AC voltage outputs ($V_{oa}$, $V_{ob}$, $V_{oc}$) to obtain DC transformed voltage values ($V_d$, $V_q$);

compare one of the DC transformed voltage values ($V_d$, $V_q$) to a desired voltage output set point and produce an error signal;

activate a software switch to couple a MRFT block output signal biased by an output of a biasing block to the dq0-to-abc transformation block while decoupling the PID controller from dq0-to-abc transformation block;

apply the error signal to an input of the MRFT block;

produce an output from the MRFT block that is an increment/decrement value for a memorized last output value of the PID controller;

calculate a sum of the output from the MRFT block and increment/decrement output value from the MRFT block as a new modulation index input for the dq0-to-abc transformation block, produce the dq0-to-abc transformation block output to represent modulation indexes for each of the three phases;

apply the three-phase modulating signal to three pulse-width modulators for phases a, b and c, and apply the output signals of the three-phase pulse-width modulator to electronic switches, thereby producing three AC voltages ($V_{oa}$, $V_{ob}$, $V_{oc}$) modulated by the output signal of the MRFT block.

11. The non-transitory computer readable storage medium of claim 10, the software further including instructions to:

initialize values for a threshold parameter $\beta$ and desired phase margin $\phi_m$;

run the MRFT block having the parameters of $\beta$ and h to produce self-sustained oscillations in the DC transformed voltage ($V_d$);

upon stabilization of a frequency and amplitude of the self-sustained oscillations of the DC transformed voltage ($V_d$), measuring the frequency ($\Omega_0$) and the amplitude ($a_0$) of the self-sustained oscillations of the DC transformed voltage ($V_d$);

select the values of $c_1$, $c_2$ and $c_3$ based on the equations:

$$c_1\sqrt{1+\xi^2}=1 \text{ and } \beta=\sin(\phi_m-\tan^{-1}\xi),$$

where $$\xi = 2\pi c_3 - \frac{1}{2\pi c_2}$$

and ($\phi_m$) is a desired phase margin; and compute PID parameters $K_c$, $T_i$, and $T_d$ based on equations:

$$K_c = c_1 \frac{4h}{\pi a_0}, \quad T_i = c_2 \frac{2\pi}{\Omega_0}, \text{ and } T_d = c_3 \frac{2\pi}{\Omega_0}.$$

12. The non-transitory computer readable storage medium of claim 11, wherein $\beta=0.8$, $c_1=0.95\pm5\%$, $c_2=0.36\pm5\%$, and $c_3=0.12\pm5\%$.

\* \* \* \* \*